(12) United States Patent
Yue et al.

(10) Patent No.: US 11,561,808 B2
(45) Date of Patent: Jan. 24, 2023

(54) SYSTEM AND METHOD OF PROVIDING ACCESS TO AND MANAGING VIRTUAL DESKTOPS

(71) Applicant: MICROSOFT TECHNOLOGY LICENSING, LLC, Redmond, WA (US)

(72) Inventors: Leo Tian Yue, Redmond, WA (US); Clinton Edward Rutkas, Sammamish, WA (US); Lee Dicks Clark, Seattle, WA (US); Peter Josef Kreiseder, Redmond, WA (US); Robert Joseph Disano, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/120,636

(22) Filed: Dec. 14, 2020

(65) Prior Publication Data
US 2022/0188132 A1  Jun. 16, 2022

(51) Int. Cl.
*G06F 3/0482* (2013.01)
*G06F 9/451* (2018.01)
*G06N 20/00* (2019.01)
*G06F 3/04812* (2022.01)

(52) U.S. Cl.
CPC ............ *G06F 9/452* (2018.02); *G06F 3/0482* (2013.01); *G06F 3/04812* (2013.01); *G06N 20/00* (2019.01)

(58) Field of Classification Search
CPC .... G06F 9/452; G06F 3/04812; G06F 3/0482; G06N 20/00
See application file for complete search history.

(56) References Cited

U.S. PATENT DOCUMENTS

| 2003/0179240 A1* | 9/2003 | Gest | G06F 3/0481 |
| | | | 715/779 |
| 2005/0125739 A1* | 6/2005 | Thompson | G06F 3/0481 |
| | | | 715/778 |
| 2009/0083655 A1* | 3/2009 | Beharie | G06F 3/0481 |
| | | | 715/781 |
| 2013/0067394 A1* | 3/2013 | Nan | G06F 3/04817 |
| | | | 715/784 |

(Continued)

OTHER PUBLICATIONS

"International Search Report and Written Opinion Issued in PCT Application No. PCT/US21/057468", dated Apr. 14, 2022, 15 Pages.

*Primary Examiner* — Michael Roswell
(74) *Attorney, Agent, or Firm* — Lewis Roca Rothgerber Christie LLP

(57) ABSTRACT

A method and system for providing access to virtual desktops may include receiving an input indicating hovering of a pointer over an icon in a toolbar, identifying one or more existing virtual desktops, determining a state for each of the one or more existing virtual desktops by identifying one or more instances of any applications that are currently running in each of the one or more existing virtual desktops and determining a running state for each of the one or more instances, and displaying a preview of each of the one or more existing virtual desktops in response to the hovering of the pointer over the icon. The preview may include displaying the running state for one of the one or more instances for each existing virtual desktop.

20 Claims, 11 Drawing Sheets

(56) References Cited

U.S. PATENT DOCUMENTS

| | | | |
|---|---|---|---|
| 2014/0188977 A1* | 7/2014 | Song | H04L 67/10 709/203 |
| 2016/0034159 A1* | 2/2016 | Vranjes | G06F 3/04842 715/803 |
| 2016/0077685 A1* | 3/2016 | Fang | G06F 9/452 715/778 |

* cited by examiner

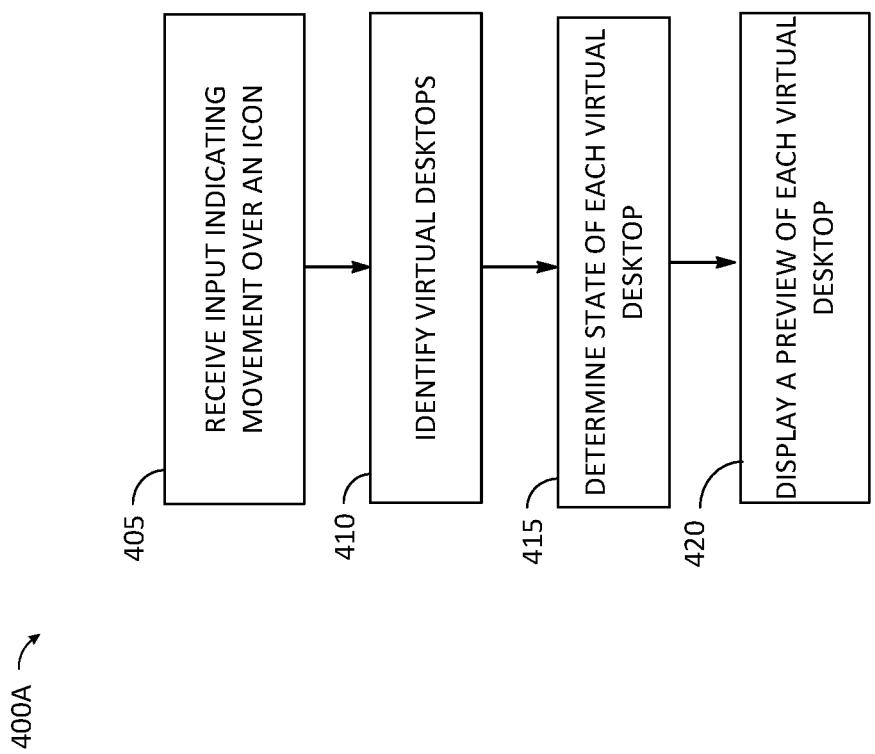

SYSTEM AND METHOD OF PROVIDING ACCESS TO AND MANAGING VIRTUAL DESKTOPS

TECHNICAL FIELD

This disclosure relates generally to management of virtual desktops, and, more particularly, to a method of and system for providing efficient access to virtual desktops and for creating and managing virtual desktops.

BACKGROUND

With the large number of applications available and used by users of computing devices on a single device, it is sometimes difficult for users to manage and keep track of all the different applications running simultaneously on their devices. To assist users better manage their applications, some computing systems offer virtual desktops.

A virtual desktop often expands the virtual space of a computer's desktop environment beyond the physical limits of the screen's display area through the use of software. This may be done by enabling the user to make virtual copies of their desktop viewport. Different open windows can exist on each of the desktop viewports and the user may be able to switch between the different viewports to access the different windows. This may help the users to visually and cognitively separate different tasks on their computing devices. As a result, instead of juggling multiple windows on the same viewport, users can switch between different virtual desktops to access the multiple windows. Although virtual desktops are helpful in separating different tasks into different desktops, they are often difficult to access and manage.

Hence, there is a need for systems and methods of providing access to and managing virtual desktops.

SUMMARY

In one general aspect, the instant disclosure describes a data processing system having a processor and a memory in communication with the processor wherein the memory stores executable instructions that, when executed by the processor, cause the data processing system to perform multiple functions. The functions may include receiving an input indicating hovering of a pointer over an icon in a toolbar, identifying one or more existing virtual desktops, determining a state for each of the one or more existing virtual desktops by identifying one or more instances of any applications that are currently running in each of the one or more existing virtual desktops and determining a running state for at least one of the one or more instances, and displaying a preview of each of the one or more existing virtual desktops in response to the hovering of the pointer over the icon. Where the preview includes displaying the running state for one of the one or more instances for each of the one or more existing virtual desktops.

In yet another general aspect, the instant disclosure describes a method for creating a new virtual desktop in a client device. The method may include determining if the new virtual desktop would be beneficial to a user of the client device, upon determining that the new virtual desktop would be beneficial, displaying a notification about creating the new virtual desktop, receiving a user input via the notification, the user input indicating a user's approval of creating the new virtual desktop, and upon receiving the user input, displaying a user interface (UI) element for creating the new virtual desktop.

In a further general aspect, the instant disclosure describes a non-transitory computer readable medium on which are stored instructions that when executed cause a programmable device to receive an input indicating hovering of a pointer over an icon in a toolbar, identify one or more existing virtual desktops, determine a state for each of the one or more existing virtual desktops by identifying one or more instances of any applications that are currently running in each of the one or more existing virtual desktops and determining a running state for at least one of the one or more instances, and display a preview of each of the one or more existing virtual desktops in response to the hovering of the pointer over the icon. Where the preview includes displaying the running state for one of the one or more instances for each of the one or more existing virtual desktops.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 4A is a flow diagram showing an example of a method for providing access to virtual desktops.

DETAILED DESCRIPTION

Figure 1:
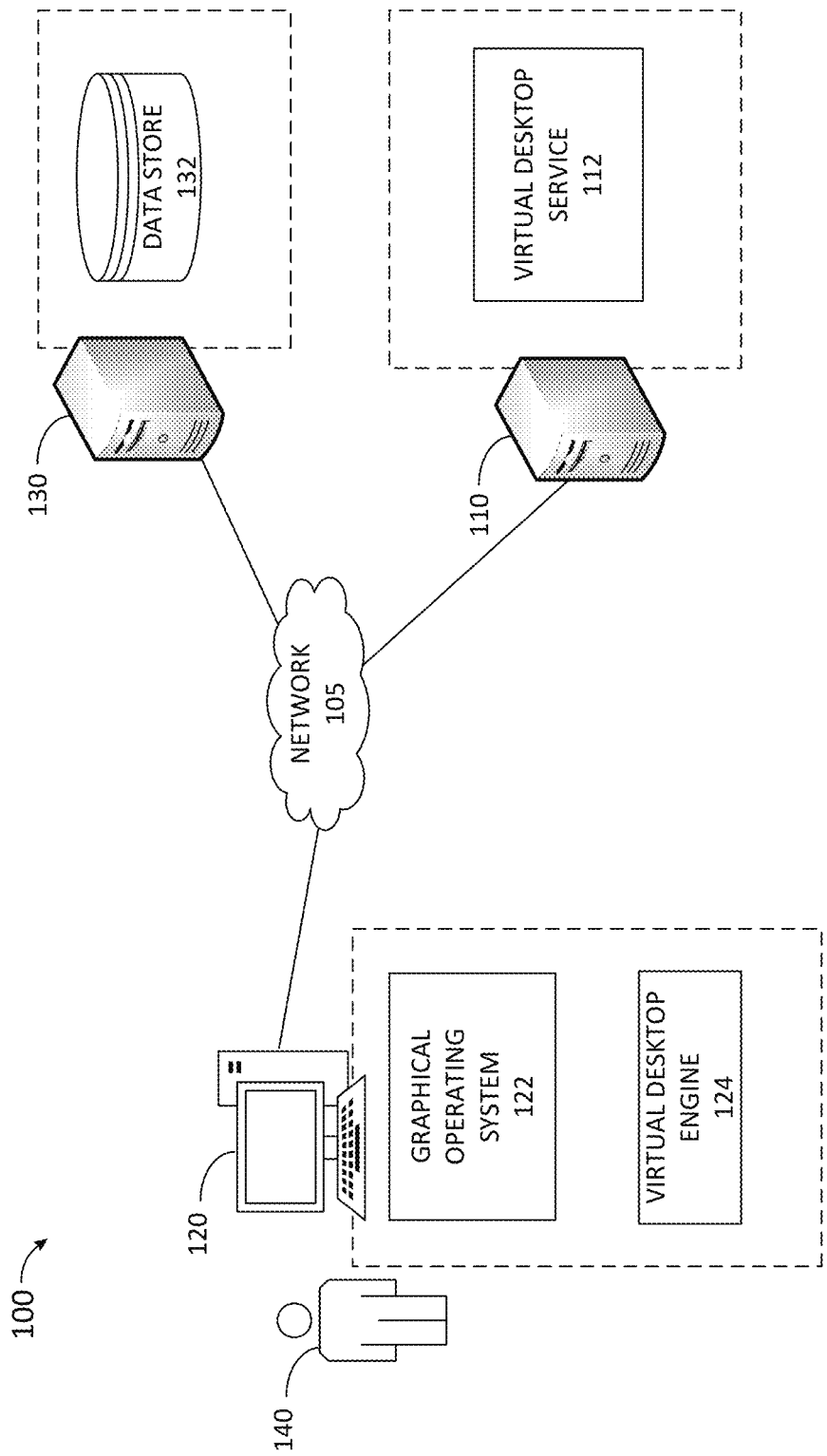
FIG. 1 depicts an example of a system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Virtual desktops can be used by computer users to visually and/or cognitively separate their open windows into different groups. This can help users access a desired window more quickly, when they have multiple windows open (e.g., running application instances). For example, when a user has 10 different windows of the same application open (e.g., ten different Word documents), it is often difficult and time consuming to look through the various windows and locate the desired window. By separating the different windows into distinct groups that are located on different virtual desktops, the users can locate a desired window more quickly. However, to achieve efficiency, each of the virtual desktops themselves should be easily accessible. Yet, current mechanism for providing access to different virtual desktops often require multiple user inputs (e.g., multiple clicks). As such, there exists a technical problem of providing efficient access to different virtual desktops.

Moreover, current mechanism of providing access to virtual desktops are unintuitive. As a result, many users are not unaware of the availability of virtual desktops and/or do not know how to create and use virtual desktops. Thus, even though use of virtual desktops may be very valuable to many users, it is current used by few users. Thus, there exists another technical problem of notifying users of the availability of virtual desktops and providing an easy to use mechanism for creation and management of virtual desktops.

To address these technical problems and more, in an example, this description provides a technical solution for offering efficient access to virtual desktops, providing notification when use of virtual desktops is beneficial to a user, walking the user through the process of creating a new virtual desktop and automatically creating and/or managing virtual desktops. To do so, techniques may be used to provide a virtual desktop extended UI. This may be done by displaying a preview of the available virtual desktops and enabling the user to switch between different virtual desktops and/or create a new virtual desktop when the user utilizes an input device to hover over a UI element. In one implementation, the UI element may be a task view taskbar icon. This provides quick and efficient access to the different virtual desktops. Furthermore, when certain conditions are met, a notification may be provided to the user to advise the user that use of a new virtual desktop may be beneficial to them. In some implementations, the user may also be presented with the steps required to create a virtual desktop. Additionally, in some implementations, virtual desktops may be created automatically, open widows may be organized and moved into different virtual desktops automatically, and/or appropriate names may be assigned to different virtual desktops automatically. This significantly enhances the process of accessing, creating and managing virtual desktops.

As will be understood by persons of skill in the art upon reading this disclosure, benefits and advantages provided by such implementations can include, but are not limited to, a technical solution to the technical problem of inefficient access to and lack of management capabilities for virtual desktops in current computer systems. The technical solutions may enable users to quickly access a preview of available virtual desktops, select a desired virtual desktop, and create a new virtual desktop by performing minimal actions. Furthermore, the technical solutions provide a mechanism for notifying the user when it is beneficial to the user to create a new virtual desktop and/or guide the user through the steps required for creating a virtual desktop. Still further, the technical solutions provide for automatic creation, naming and management of virtual desktops. The benefits provided by these technology-based solutions yield more user-friendly mechanisms for providing access to and enabling creation and management of virtual desktops, thus making use of virtual desktops available to more users.

FIG. 1 illustrates an example system 100, upon which aspects of this disclosure may be implemented. The system 100 may include a server 110 which may include and/or execute a virtual desktop service 112 and a client device 120. The server 110 may operate as a shared resource server located at an enterprise accessible by various computer client devices such as client device 120. The server may also operate as a cloud-based server for offering global virtual desktop services. Although shown as one server, the server 110 may represent multiple servers for performing various different operations.

The virtual desktop service 112 may operate as the backend engine for managing virtual desktops. The virtual desktop service 112 may access one or more data sets and utilize one or more machine-learning (ML) models to create name(s) for virtual desktops, determine when a new virtual desktop may be beneficial to a user and/or identify how to categorize different open windows into different virtual desktops for a user. Data relating to creation and/or management of virtual desktops may be provided by the virtual desktop service 112 to client devices such as client device 120 for processing and/or display.

The server 110 may be connected to (e.g., via a network 105) or include a storage server 130 containing a data store 132. The data store 132 may function as a repository in which one or more data sets containing data about users (e.g., contextual information of the users), different applications, and/or different virtual desktops is stored. In one implementation, data store 132 may also include one or more data sets containing training data for training the ML models used in creating and/or managing virtual desktops.

The client device 120 may be connected to the server 110 via the network 105. The network 105 may be a wired or wireless network(s) or a combination of wired and wireless networks that connect one or more elements of the system 100. The client device 120 may be a personal or handheld computing device having or being connected to input/output elements that enable a user 140 to interact with content such as different applications, windows and/or virtual desktops. Examples of suitable client devices 120 include, but are not limited to, personal computers, desktop computers, laptop computers, mobile telephones; smart phones; tablets; phablets; smart watches; wearable computers; gaming devices/computers; televisions; head-mounted display devices and the like. The internal hardware structure of a client device is discussed in greater detail in regard to FIGS. 5 and 6.

The client device 120 may include a graphical operating system 122 and a virtual desktop engine 124. The graphical operating system 122 may include one or more computer programs executed on the client device 120 that process, manage and display one or more GUIs on a display device associated with the client device 120 (e.g., a monitor, display screen, etc.). For example, the graphical operating system 122 may be a Microsoft Windows® operating system. Among other features, the graphical operating system 122 may configure the client device 120 to be responsive to user input. User input may include input received via an input element such as a keyboard or a pointing device (e.g., a mouse) that enables the user 140 to interactively access different applications, windows and/or virtual desktops. For example, the user may utilize a pointing device to move a pointer over an icon on the screen to enable display of available virtual desktops. The graphical operating system 122 may receive the user input, identify the currently available virtual desktops, determine the latest status of an active window on each currently available virtual desktop, and provide a preview of the available virtual desktops in response to the user input (e.g., in response to moving the pointer over the icon).

In some implementations, the client device 120 may include a virtual desktop engine 124 for managing various operations relating to virtual desktops. The virtual desktop engine 124 may operate similarly to and locally provide similar functions as that of the virtual desktop service 112. For example, the virtual desktop engine 124 may examine open windows on the client device 120 and determine based on parameters such as the number of open windows, the types of applications associated with the open windows and/or contextual information of the user, whether creating one or more virtual desktops is beneficial to the user. In some implementations, this determination is based solely on the number of open windows. For example, if there are more than a predetermined number of windows open (e.g., more than 10 windows), the virtual desktop engine 124 determines that the user would benefit from creating a new virtual desktop and may provide a notification to the user accordingly.

In alternative implementations, the determination is based on the number of open windows and the types of applications with which they are associated. For example, when all the open windows are associated with one program (e.g., multiple browser windows), the virtual desktop engine 124 determines that there is no need for creating a new virtual desktop. However, if the open windows are associated with different applications that can be categorized into different groups, the virtual desktop engine 124 may determine that the user may benefit from organizing the open windows into multiple virtual desktops. In other implementations, contextual information of the user such as the user's history of virtual desktop usage, user's history of application and/or window usage, and the like are also taken into account. This information may be stored locally or in a data store such as the data store 132.

The virtual desktop engine 124 may also automatically assign names for virtual desktops and/or automatically categorize the open windows into multiple virtual desktops. To perform these functions, the virtual desktop engine 124 may access one or more data sets and utilize one or more ML models. The data sets and/or ML models may be stored locally and/or stored remotely (e.g., in the cloud). It should be noted that although it is shown as a separate element, the virtual desktop engine 124 may be a part of the graphical operating system 122.

Figure 2A:
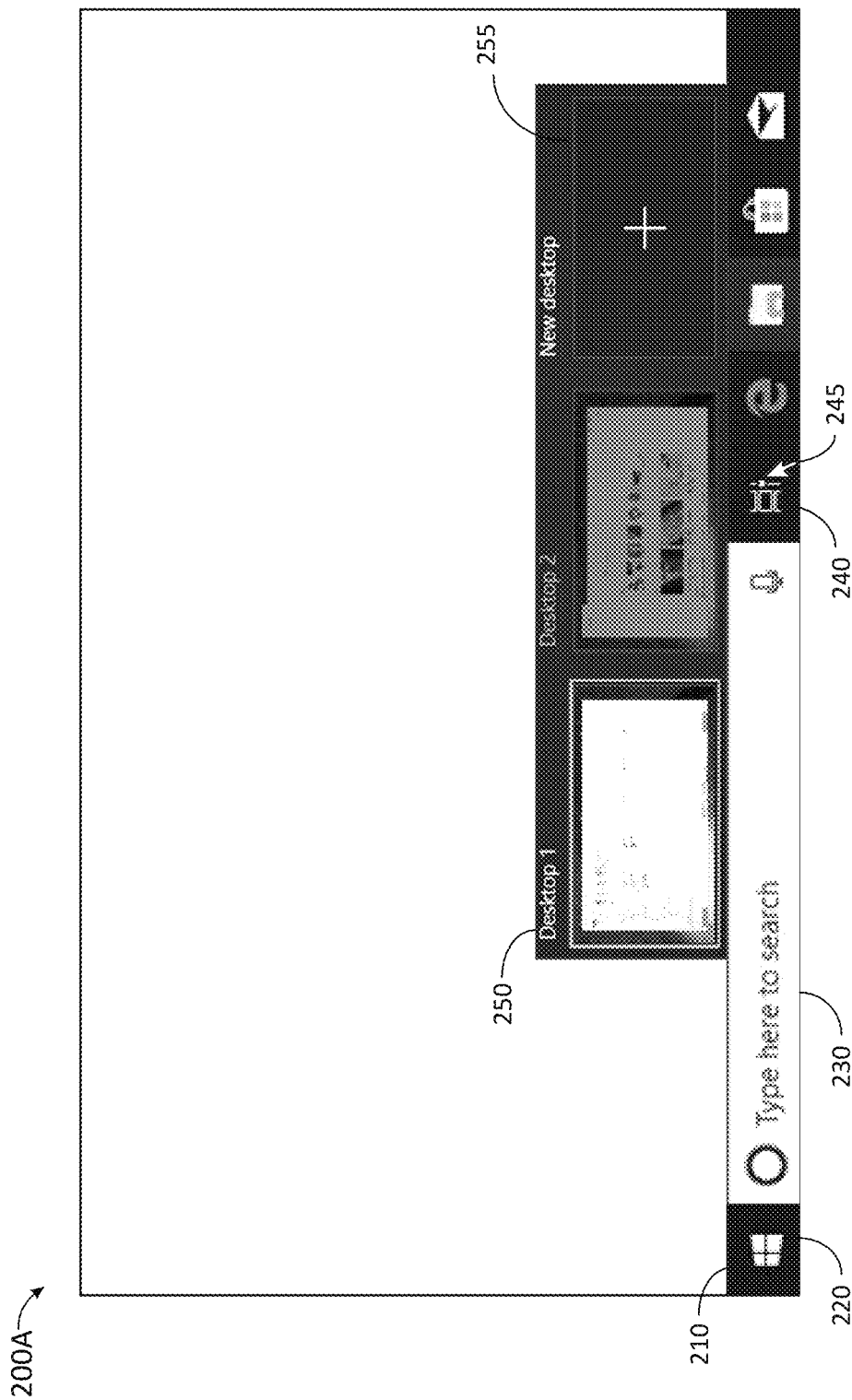
FIGS. 2A-2B are examples of graphical user interfaces (GUI) for providing efficient access to virtual desktops.
Figure 2B:
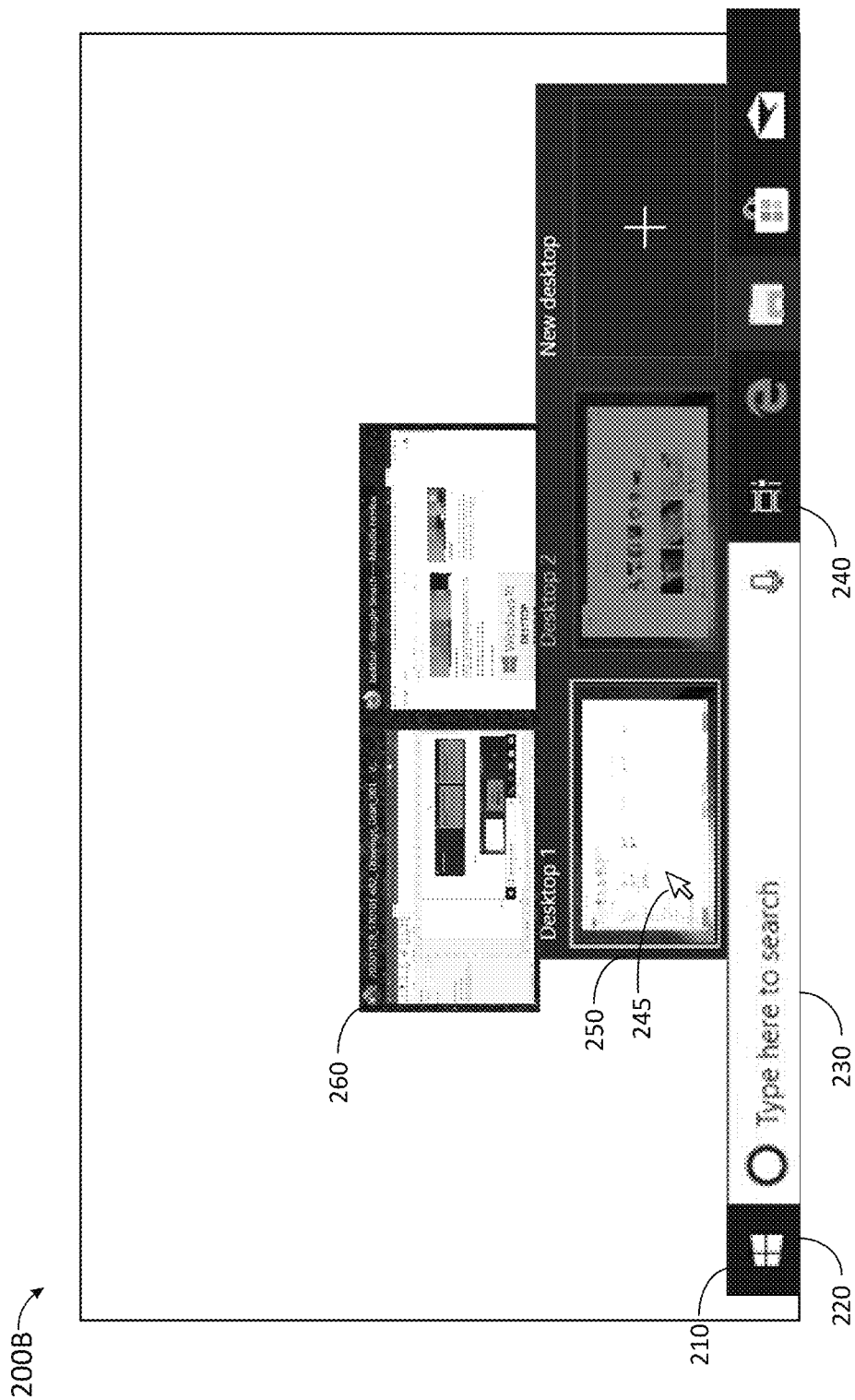

FIGS. 2A-2B depict example GUI screens for providing efficient access to virtual desktops. In one implementation, the GUI screen 200A of FIG. 2A displays a toolbar UI element 210 for providing access to a plurality of UI elements. The UI elements 210 may include one or more icons for accessing various functions. For example, the toolbar UI elements 210 includes a start menu icon 220, a search bar 230, a task view icon 240 and a plurality of other icons (e.g., an Internet Explorer icon, a File Explorer icon, a store icon and a Mail icon) for offering various functions. In some implementations, the toolbar UI elements 210 is a taskbar element for displaying icons for most commonly used tasks and/or for applications that are currently running. Although displayed on the bar of the GUI screen 200A, the toolbar UI element 210 may be displayed along any of the edges of the screen.

To provide easier access to virtual desktops, when a pointing device such as the pointer 245 is moved over and hovers over the task view icon 240, a virtual desktop preview UI element 250 is displayed on the GUI screen 200A. Alternatively, for touchscreens, the virtual desktop preview UI element 250 may be displayed, when a touch input on the task view icon 240 is received.

The virtual desktop preview UI element 250 may include a preview for each of the open virtual desktops. For example, when there are two virtual desktops open (e.g., Desktop 1 and Desktop 2), the virtual desktop preview UI element 250 may display a preview for the first virtual desktop and a preview for the second virtual desktop. The preview may include a state of each of the open virtual desktops. The state may refer to the state of the most recently active window in each virtual desktop. For example, if the last time the user was active in virtual Desktop 2, the active window as a browser window displaying a video, the preview may provide a thumbnail for the browser window which displays the latest location on the video.

Each of the virtual desktops may be selected from the virtual desktop preview UI element 250. In some implementations, selection of a virtual desktop is made by moving the pointer 245 over and clicking on one of the available virtual desktops (or by receiving a touch input on one of the available virtual desktops). Once selected, a screen associated with the most recent active window of the selected virtual desktop may be displayed. In this manner, the user can view a preview of the available virtual desktops and switch between them with minimal input.

Because display of the virtual desktop preview UI element 250 occurs in response to a simple movement of the pointer 245 over the task view icon 240, fewer user inputs are required for accessing different virtual desktops. Furthermore, because the toolbar UI element 210 is often displayed on an edge of the screen regardless of the type of active application (e.g., the toolbar UI element 210 is displayed on the bottom of the screen on for all open windows), quick and efficient access to virtual desktops is available from any window. As a result, a user can access different virtual desktops with minimal input (e.g., no clicks) from any window. Furthermore, because the toolbar UI element 210 is easily accessible and displayed prominently in most screen, it is more likely for user to become aware of the virtual desktop functionality and begin using them.

In addition to providing a preview of the currently open virtual desktops, the virtual desktop preview UI element 250 may also allow the user to change the name of each of the virtual desktops and/or create additional virtual desktops. The name of each of the virtual desktops may be changed by selecting the current name. This may be performed by moving the pointer 245 over the name and clicking on the name. In some implementations, this action may result in creation of an editable input box, where the user can enter text to generate a desired name. Thus, the user may be able to change the name of the virtual desktop directly from the toolbar UI element 210 and with minimal input.

Creation of an additional virtual desktops may also be done directly from the virtual desktop preview UI element 250. This may be performed by selecting the New Desktop icon 255 (e.g., clicking on the plus sign or anywhere on the icon 255). Once the new virtual desktop is created, a preview thumbnail for the new virtual desktop may be added to the virtual desktop preview UI element 250. For example, the virtual desktop preview UI element 250 may display an additional preview thumbnail named Desktop 3. Thus, the user may be able to create a new virtual desktop with minimal user action and directly from the toolbar UI element 210.

In some implementations, moving a pointing device, such as the pointer 245, over one of the virtual desktop previews (e.g., hovering over one of the virtual desktop previews), may result in the display of an expanded UI element, as depicted in GUI screen 200B of FIG. 2B. The expanded UI element 260 may display a preview of the windows that are open on the selected virtual desktop. Thus, when the pointer 245 hovers over the preview thumbnail for Desktop 1, the expanded UI element 260 may display a preview thumbnail for the two windows that are open in Desktop 1. In some implementations, the preview thumbnails for the open windows may accurately reflect the latest state of each window. In this manner, the user can not only quickly access the various virtual desktops from the toolbar UI element 210 but can also identify the windows that are open in each virtual desktop. This may enable the user to quickly determine which virtual desktop to switch to.

FIGS. 3A-3D depict example GUIs for creating and managing virtual desktops. In one implementation, the GUI screen 300A of FIG. 3A displays a UI element 310 for notifying the user of availability of virtual desktops. This may occur, when the graphical operating system and/or virtual desktop engine determine that the user may benefit from use of virtual desktops. For example, when the number of windows open on the current desktop exceeds a predetermined number, the categories of open windows or applications indicates they can be categorized into different groups and/or contextual user information indicates the user is likely to benefit from use of virtual desktops. When this determination is made, a notification UI element such as the UI element 310 may be provided in the display screen to notify the user. In some implementations, the notification UI element may be a pop-up UI element. In other implementations, the notification may be provided via other mechanisms. For example, the notification may be included in a notifications pane of the display screen.

The notification UI element may notify the user that they can benefit from using virtual desktops and may request that the user select whether or not they are interested in creating a virtual desktop via UI elements 320 or 330. In some implementations, the notification UI element may include more information about virtual desktops, how they operate and/or how they can benefit the user. Alternatively, the notification UI may include a link for more information about virtual desktops. In this manner, the notification UI can also help more useful become familiar with virtual desktop functionalities.

When the user is not interested in creating a new virtual desktop, they may select the UI element 330, upon selection of which, the notification UI element 310 may disappear. When, however, the user is interested in creating a new virtual desktop, they may choose the UI element 320. Upon selection of the UI element 320, a screen such as screen 300B of FIG. 3B may be displayed. As depicted, the screen 300B removes the notification UI element 310 and instead displays an UI element 340 which includes a preview of the currently available virtual desktops as wells a UI element 345 for creating a new virtual desktop. In some implementations, the UI element 340 may display the UI element 345 as being selected (e.g., being highlighted) for guiding the user through the process of creating a new virtual desktop. The user may then be able to select the UI element 345 (e.g., click on or touch the UI element 345) to easily create a new virtual desktop. In some implementations, the UI element 340 does not the display the preview thumbnails for the currently available virtual desktops. Instead, the UI element displayed upon user's approval for creating a new virtual desktop may only include a UI element for creation of the new virtual desktop (e.g., the portion of UI element 340 displaying the UI element 345).

In alternative implementations, instead of guiding the user to create new virtual desktops, the system may automatically create one or more new virtual desktops. To achieve this, a notification UI element such as the notification UI element 350 of FIG. 3C may first be displayed. As depicted in screen 300C, the UI element 350 may notify the user that they can benefit from use of virtual desktops and may offer to automatically create one or more virtual desktops and manage the user's open windows, upon the user's approval. This is to ensure that the user is aware of the creation of new virtual desktops and may be particularly important when the action also involves managing the user's open windows. Choosing the type of notification to provide (e.g., notification UI element 310 or notification UI element 350) may depend on various parameters such as contextual user information. For example, one of the factors may be the user's previous use of virtual desktops. Other factors may include the user's previous responses to such notifications, the number of open windows, and the user's level of proficiency, among others.

In some implementations, the notification UI element 350 may include two questions. One question may ask the user if they are interested in the system automatically creating a new virtual desktop and the other question may relate to whether they are also interested in the system managing their open windows. In one implementation, the notification UI element may only ask the user if they are interested in the system automatically creating a new virtual desktop. If the user responds positively, they may then be presented with a second UI element which questions whether the user is interested in the system also managing their open windows. In this manner, the user may be able to choose automatic creation of new virtual desktops, while still retaining control over how their open windows are categorized and moved into the available virtual desktops.

Management of virtual desktops may involve determining how to categorize the user's open windows into one or more categories and moving the open windows to various virtual desktops in accordance with their categories. For example, different windows may be categorized based on the functionality of the applications with which they are associated. In an example, this may involve categorizing the windows into categories such as documents (e.g., for content creation windows such as word documents, spreadsheet documents, and the like), communications (e.g., for windows associated with email documents, instant messaging applications, and other communication applications), Entertainment (e.g., for windows associated with a multimedia player such as a music player, a video player, a browser displaying a video and the like).

In alternative implementations, the categories are based on different user profiles. For example, the categories may include work, personal, family, social interactions and the like. In such implementations, the categories may be determined based on user accounts used in each of the open windows (e.g., work account or personal account), the person with which the user communicates (e.g., emailing a coworker or emailing a friend), the type of application, the type of task they are performing in each application and the like. The categories may be identified, and the open windows may be categorized by one or more ML models, as discussed above.

When the user is not interested in automatic creation of a new virtual desktop and/or management of their open windows, they may select the UI element 370, upon selection of which, the notification UI element 350 may disappear. When, however, the user is interested in automatic creation of a new virtual desktop, they may choose the UI element 360. Upon selection of the UI element 360, the system may automatically create one or more new virtual desktops and/or move windows that are currently open based on the determined categories.

In some implementations, the process of creating and/or managing virtual desktops may also involve naming the new virtual desktops and/or renaming previously available virtual desktops. The assigned names may be associated with the categories identified for the virtual desktops. For example, when virtual desktops are created based on identified categories for open windows, each virtual desktop may be assigned a name that relates to an identified category (e.g., communications, documents, and the like). The open windows may then be moved to the corresponding virtual desktop such that the user can easily identify how the virtual desktops and open windows were categorized.

Figure 3A:
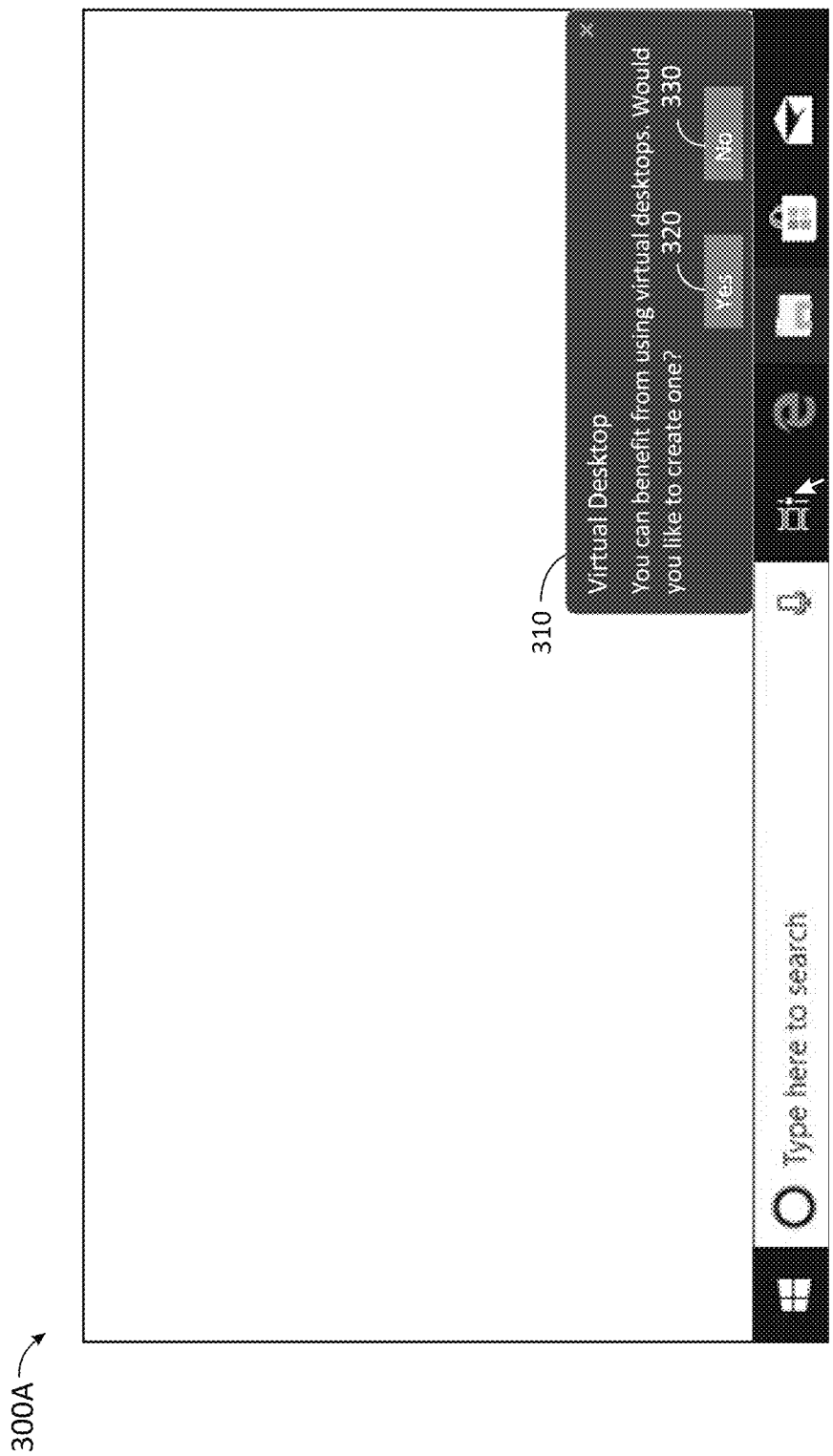
FIGS. 3A-3D are example GUIs for creating and managing virtual desktops.
Figure 3B:
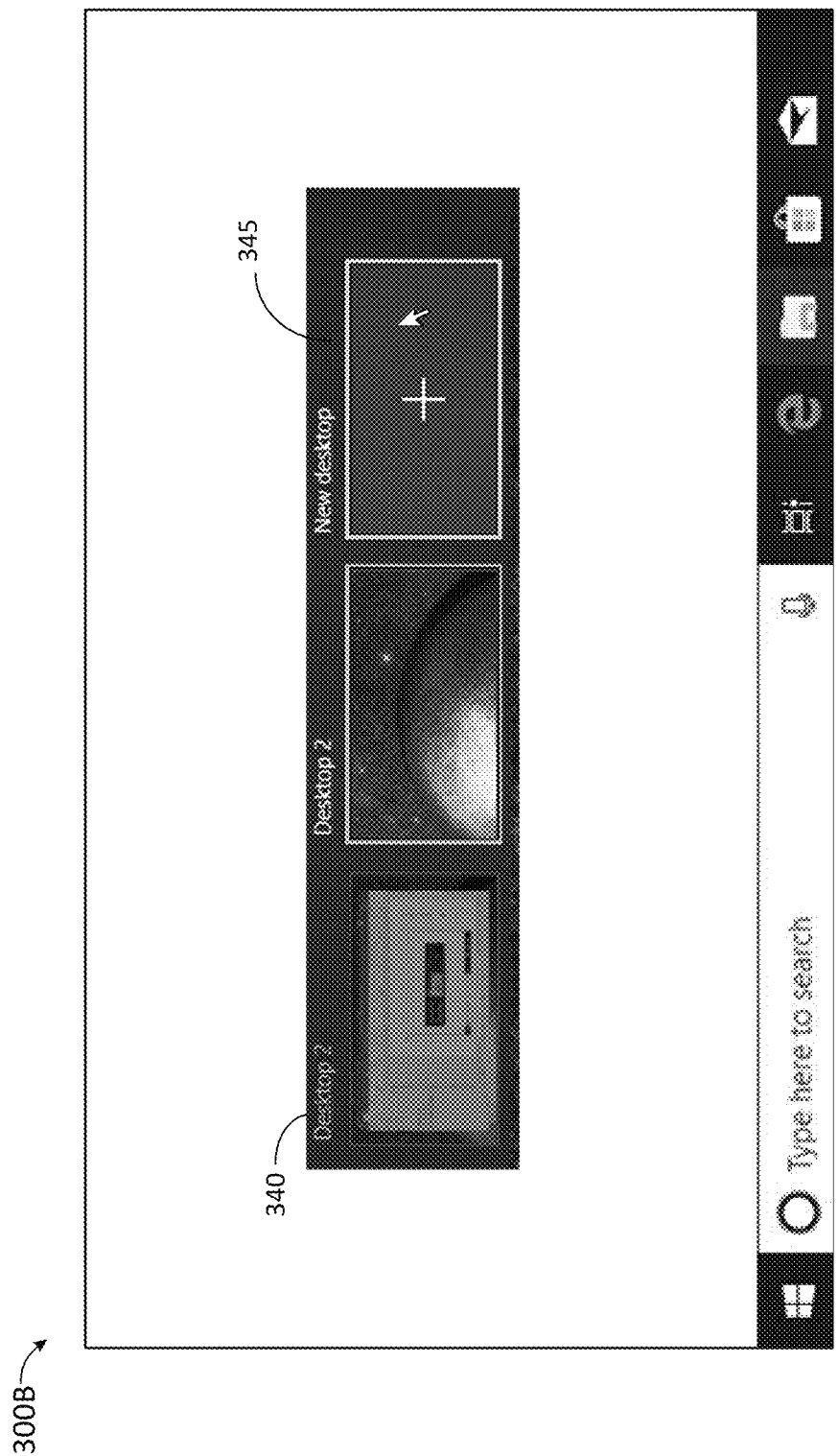
Figure 3C:
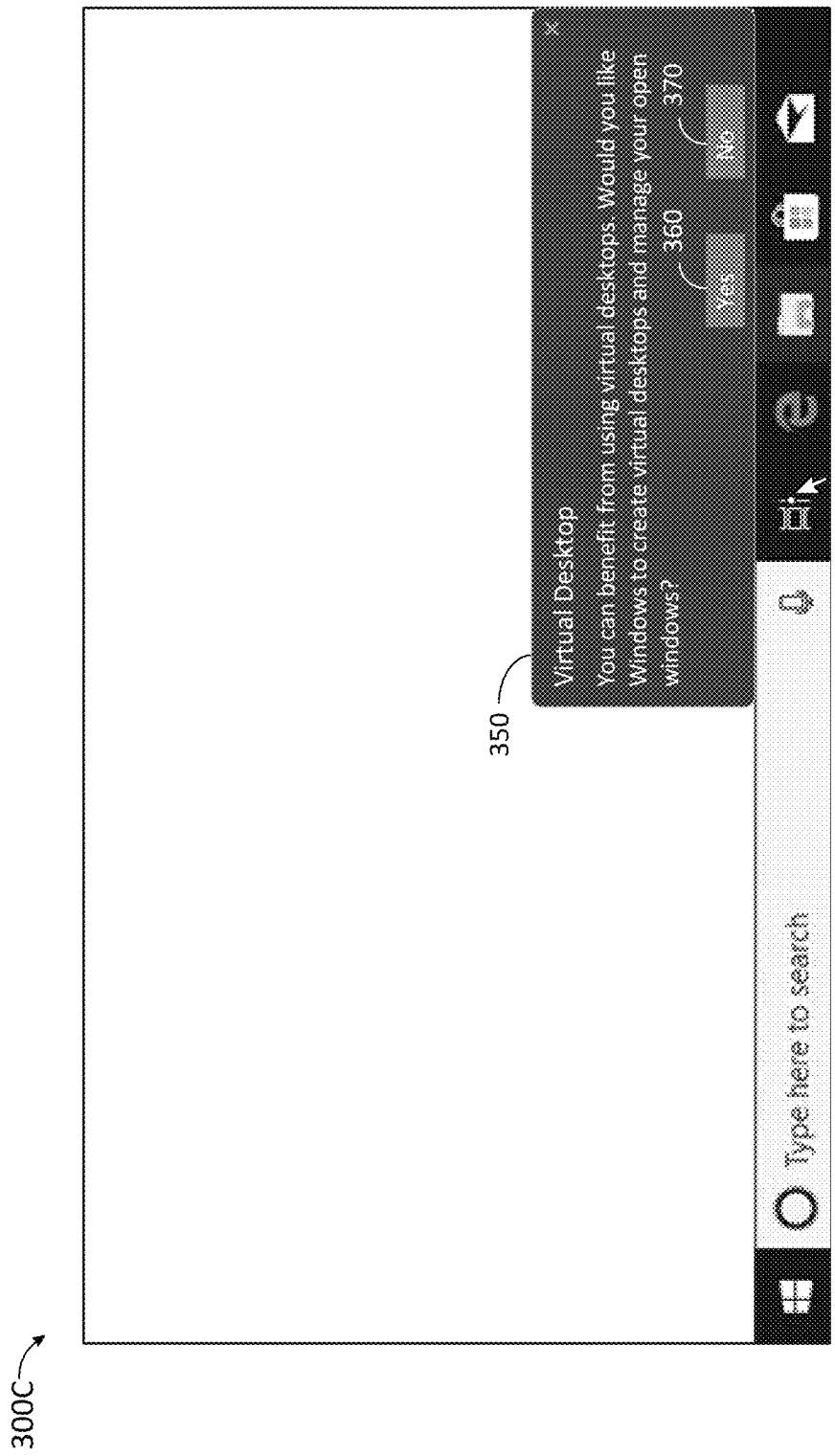
Figure 3D:
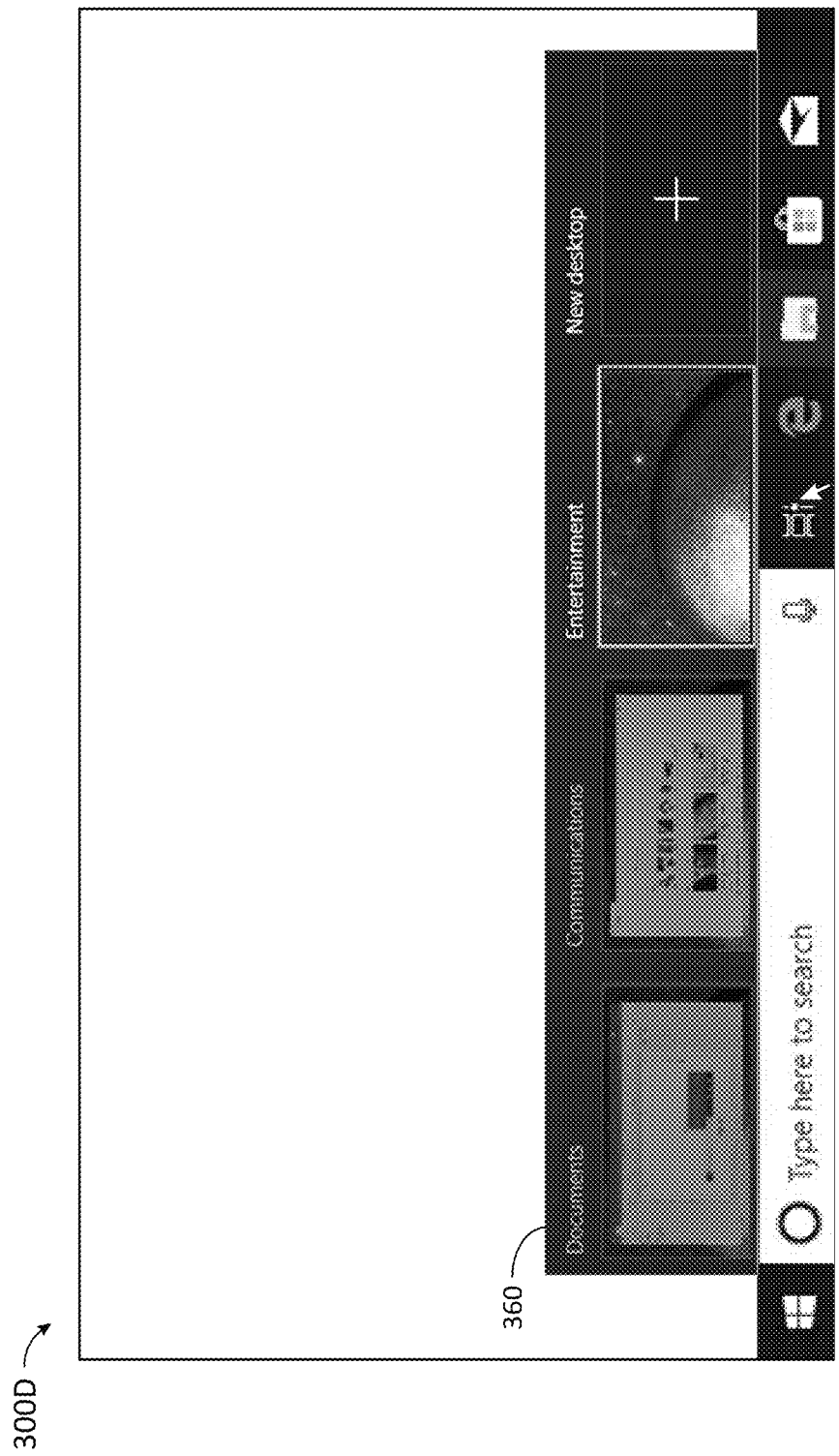

Once the new virtual desktops are created and/or windows are moved around into the different virtual desktops, a screen such as screen 300D of FIG. 3D may be displayed to present the latest virtual desktops. As depicted, the screen 300D removes the notification UI element 350 and instead displays an UI element 360 which includes a preview of the currently available virtual desktops. As depicted, the UI element 360 may present the virtual desktops with their assigned names and may display the state of each virtual desktop (e.g., state of the most recent active window in each virtual desktop).

FIG. 4A is a flow diagram depicting an exemplary method 400A for providing access to virtual desktops. In an example, one or more steps of method 400A may be performed by a graphical operating system (e.g., graphical operating system 122 of FIG. 1), a virtual desktop engine (e.g., virtual desktop engine 124 of FIG. 1) and/or a virtual desktop service (e.g., virtual desktop service 112 of FIG. 1).

At 405, method 400A may begin by receiving an input indicating a movement over an icon. The movement may involve moving a pointing device on and hovering over a specific icon. The icon may be associated with virtual desktops and may be displayed on an easily accessible UI element such as a task toolbar. Upon receiving the user input, method 400A may proceed to identify currently available virtual desktops on the client device associated with the screen, at 410. This may involve determining if more than one virtual desktop is currently being used on the device and identifying parameters associated with each virtual desktop (e.g., names assigned to each virtual desktop).

Once the available virtual desktops are identified, method 400A may proceed to determine the state of each virtual desktop, at 415. This may involve identifying, for each virtual desktop, the most recently active window (e.g., the window that was last active on the virtual desktop). In some implementations, determining the state of each virtual desktop may also involve determining the latest state of the last active window. This latest state may refer to the most current status of the window (e.g., the latest page of the document, the most current position of a video, and the like).

After the virtual desktops are identified and their state is determined, method 400A may proceed to display a preview for each of the identified virtual desktops, at 420. The preview may be displayed adjacent to the icon for which user input was received and may include information about the state of each identified virtual desktop. This may involve displaying a thumbnail for the last active window, where the thumbnail displays an accurate current state of the window. As discussed above, one of the identified virtual desktops may be accessed from the preview by, for example, moving a pointing device on and clicking over any of the previews.

In this manner, upon receiving an indication of movement over a specific icon, an accurate preview of the available virtual desktops is provided. As such, access to virtual desktops is quickly and efficiently provided in a manner that requires minimal user effort. This increases efficiency and creates more awareness of the availability of virtual desktops.

Figure 4B:
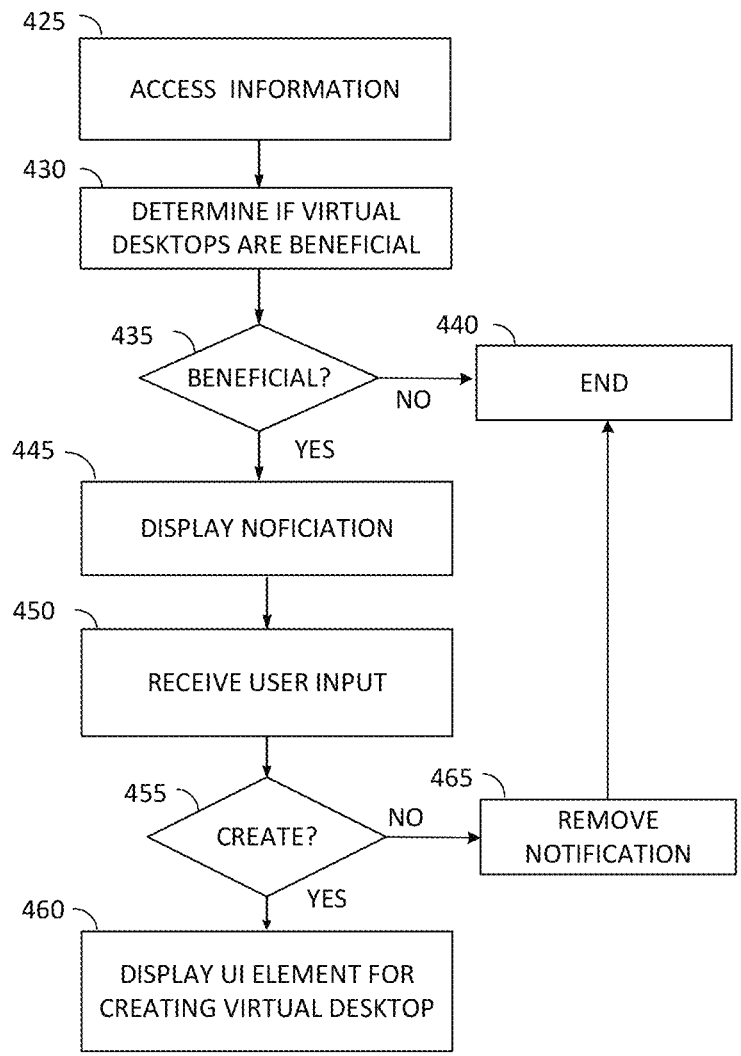
FIG. 4B is a flow diagram showing an example of a method for suggesting creation of and creating a new virtual desktop.

FIG. 4B is a flow diagram showing an example of a method 400B for suggesting creation of and creating a new virtual desktop. In an example, one or more steps of method 400B may be performed by a graphical operating system (e.g., graphical operating system 122 of FIG. 1), a virtual desktop engine (e.g., virtual desktop engine 124 of FIG. 1) and/or a virtual desktop service (e.g., virtual desktop service 112 of FIG. 1).

At 425, method 400 may begin by accessing information. The information accessed may include contextual user information, information about currently open windows on the device, information about currently open virtual desktops, and others. The information may be stored locally or in a remote storage device. Once all required information is accessed and/or retrieved as needed, method 400B may proceed to determine based on the accessed information, whether creation of new virtual desktop(s) will be beneficial to the user, at 430. As discussed above, this step may involve the use of one or more ML models that analyze history data and other parameters to determine when the use is more likely to make use of and/or benefit from the use of additional virtual desktops. Once the analysis is complete, method 400B may determine, at 435, based on the results of the analysis, whether creation of new virtual desktops would be beneficial to the user.

When it is determined that the new virtual desktop(s) are not useful to the user at this point (no at 435), method 400B may proceed to end, at 440. When it is determined, however, that the new virtual desktop(s) are beneficial to the user (yes at 435), method 400B may proceed to display a notification to the user, at 445. The notification may be similar to the notification UI element 310 of FIG. 3A and may require the user's input for proceeding with creation of additional virtual desktop(s).

After providing the notification, method 400B may wait until it receives the user's input regarding the creation of additional virtual desktop(s), at 450. The input may be received via a UI element and may include selection of an option to either proceed with creation of additional virtual desktop(s) or halt the creation of additional virtual desktop(s). Once the input is received, method 400B may proceed to determine if the user indicated a desire to create an additional virtual desktop, at 455.

When it is determined that the input indicates a desire to proceed with creation of an additional virtual desktop (yes at 455), method 400B may proceed to display a UI element for creating a new virtual desktop, at 460. The UI element may include UI control that enables the user to create a new virtual desktop upon selection. In one implementation, the displayed UI element guides the user through the steps required for creation of a new virtual desktop. This may require receiving one or more additional user inputs to proceed through the steps of creating a new virtual desktop. In some implementations, upon receiving a user input indicating the user's desire for creating additional virtual desktop(s), method 400B may proceed to automatically create one or more additional virtual desktops, as discussed in more details above.

When it is determined, at 455 that the user input indicates the user is not interested in creating a new virtual desktop (no at 455), method 400B may proceed, at 465, to remove the notification displayed at step 445, before moving forward to end the process, at 440. In this manner, method 400B may provide a method of notifying the user when it is likely that they can benefit from use of additional virtual desktops and/or to simplify the process of creating a new virtual desktop by guiding the user through the steps of creating a new virtual desktop.

Figure 5:
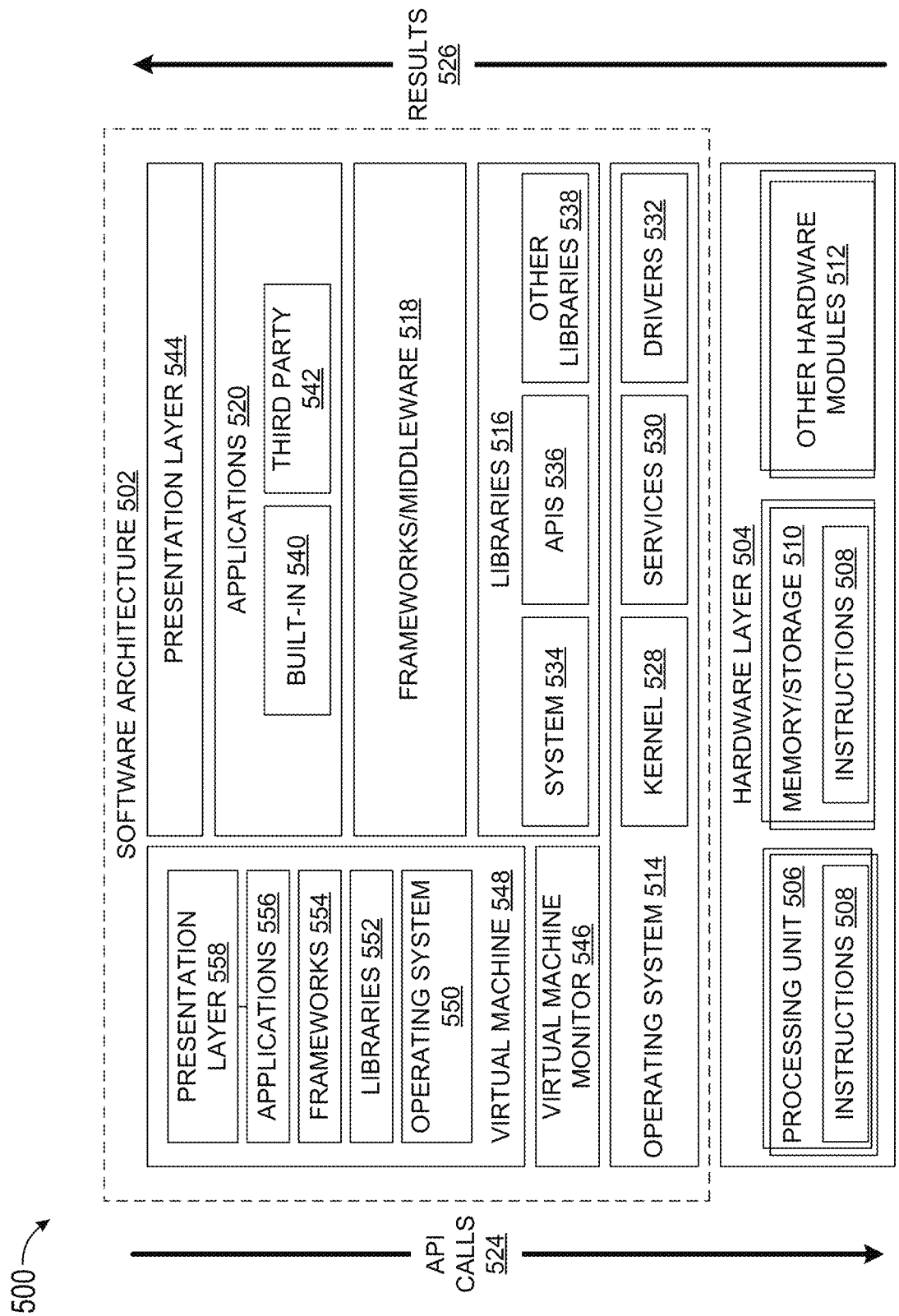
FIG. 5 is a block diagram illustrating an example of software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
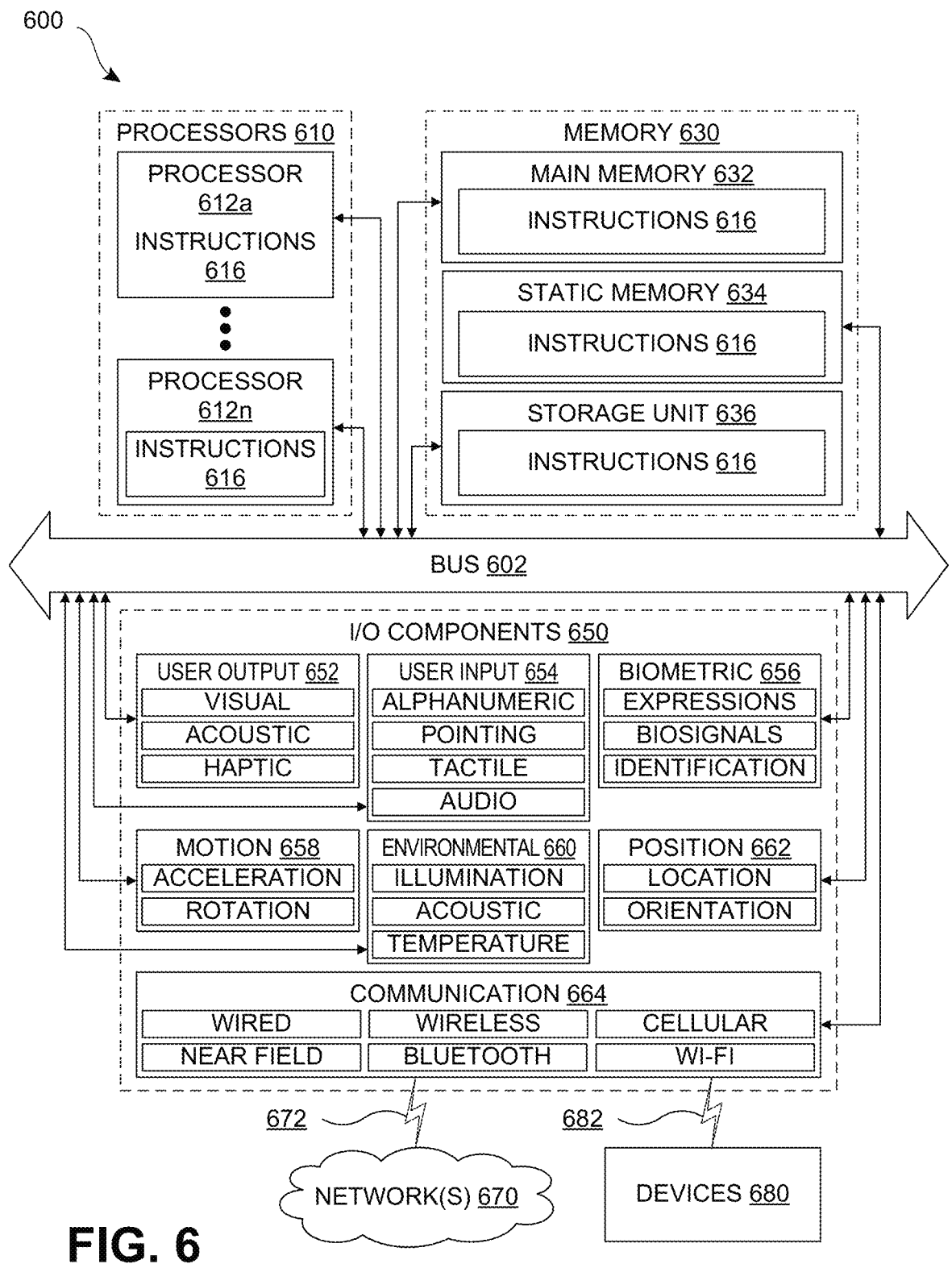
FIG. 6 is a block diagram illustrating components of an example of a machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-4) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. data processing system comprising:
a processor; and
a memory in communication with the processor, the memory comprising executable instructions that, when executed by the processor, cause the data processing system to perform functions of:
  receiving an input indicating hovering of a pointer over an icon in a toolbar;
  identifying one or more existing virtual desktops;
  determining a state for each of the one or more existing virtual desktops by identifying one or more instances of any applications that are currently running in each of the one or more existing virtual desktops and determining a running state for at least one of the one or more instances; and
  displaying a preview of each of the one or more existing virtual desktops in response to the hovering of the pointer over the icon,
  wherein the preview includes displaying the running state for one of the one or more instances for each of the one or more existing virtual desktops.

Item 2. The data processing system of item 1, wherein the icon is a task view icon.

Item 3. The data processing system of items 1 or 2, wherein the toolbar is a taskbar.

Item 4. The data processing system of any preceding item, wherein the preview is displayed adjacent to the icon.

Item 5. The data processing system of any preceding item, wherein the executable instructions when executed by the processor, further cause the data processing system to perform functions of:
  in response to the hovering of the pointer over the icon, displaying a user interface (UI) element for creating a new virtual desktop.

Item 6. The data processing system of any preceding item, wherein the executable instructions when executed by the processor, further cause the data processing system to perform functions of:
  receiving a selection of the preview of one of the one or more existing virtual desktops; and
  in response to the selection, displaying an existing virtual desktop corresponding to the selected preview.

Item 7. The data processing system of any preceding item, wherein determining the state for each of the one or more existing virtual desktops includes:
  determining which of the one or more instances was last active on each of the one or more existing virtual desktops;
  determining a latest running state for the last active instance; and
  providing display data for the latest running state of the last active instance.

Item 8. A method for creating a new virtual desktop in a client device, comprising:
  determining if the new virtual desktop would be beneficial to a user of the client device;
  upon determining that the new virtual desktop would be beneficial, displaying a notification about creating the new virtual desktop;

receiving a user input via the notification, the user input indicating a user's approval of creating the new virtual desktop; and upon receiving the user input, displaying a user interface (UI) element for creating the new virtual desktop.

Item 9. The method of item 8, wherein determining if the new virtual desktop would be beneficial to the user is made based at least in part on a number of open windows in the client device, types of applications associated with the open windows in the client device or contextual user information.

Item 10. The method of item 9, wherein determining if the new virtual desktop would be beneficial to the user is made by a machine-learning (ML) model.

Item 11. The method of item 9, wherein determining if the new virtual desktop would be beneficial to the user is made by determining if the number of open windows exceeds a predetermined number.

Item 12. The method of any of items 8-11, wherein the notification includes a first UI control for approving creation of the new virtual desktop and a second UI control for disapproving the creation of the new virtual desktop.

Item 13. The method of any of items 8-12, wherein the UI element for creating the new virtual desktop includes a preview of a currently available virtual desktop.

Item 14. A non-transitory computer readable medium on which are stored instructions that, when executed, cause a programmable device to:

receive an input indicating hovering of a pointer over an icon in a toolbar;

identify one or more existing virtual desktops;

determine a state for each of the one or more existing virtual desktops by identifying one or more instances of any applications that are currently running in each of the one or more existing virtual desktops and determining a running state for at least one of the one or more instances; and display a preview of each of the one or more existing virtual desktops in response to the hovering of the pointer over the icon, wherein the preview includes displaying the running state for one of the one or more instances for each of the one or more existing virtual desktops Item 15. The non-transitory computer readable medium of item 14, wherein the icon is a task view icon.

Item 16. The non-transitory computer readable medium of items 14 or 15, wherein the toolbar is a taskbar.

Item 17. The non-transitory computer readable medium of any of items 14-16, wherein the preview is displayed adjacent to the icon.

Item 18. The non-transitory computer readable medium of any of items 14-17, wherein the instructions when executed, further cause the programmable device to:

in response to the hovering of the pointer over the icon, displaying a user interface (UI) element for creating a new virtual desktop.

Item 19. The non-transitory computer readable medium of any of items 14-18, wherein determining the state for each of the one or more existing virtual desktops includes:

determining which of the one or more instances was last active on each of the one or more existing virtual desktops;

determining a latest running state for the last active instance; and providing display data for the latest running state of the last active instance.

Item 20. The non-transitory computer readable medium of any of items 14-19, wherein a name is displayed in the preview for each of the one or more existing virtual desktops.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor, cause the data processing system to perform functions of:
identifying a plurality of existing virtual desktops including a first virtual desktop and a second virtual desktop;
determining a state for each of the existing virtual desktops by identifying one or more instances of applications that are currently running in each of the existing virtual desktops and determining a running state for at least one of the one or more instances; and
displaying a preview of at least the first and second virtual desktops,
wherein the preview of the first virtual desktop includes displaying the running state for one of the one or more instances of applications running in the first virtual desktop, the running state comprising a state of a most recently active first window on the first virtual desktop, and the preview of the second virtual desktop includes displaying the running state of the one or more instances of applications running in the second virtual desktop, the running state comprising a state of a most recently active second window on the second virtual desktop.

2. The data processing system of claim 1, wherein the displaying the preview is in response to hovering over an icon, wherein the icon is a task view icon.

3. The data processing system of claim 1, wherein the displaying the preview is in response to hovering over an icon in a toolbar, wherein the toolbar is a taskbar.

4. The data processing system of claim 1, wherein the displaying the preview is in response to hovering over an icon, wherein the preview is displayed adjacent to the icon.

5. The data processing system of claim 1, wherein the executable instructions when executed by the processor, further cause the data processing system to perform functions of:
displaying, concurrently with the previews of the first and second virtual desktops, a user interface (UI) element for creating a new virtual desktop.

6. The data processing system of claim 1, wherein the executable instructions when executed by the processor, further cause the data processing system to perform functions of:
receiving a selection of the preview of one of the one or more existing virtual desktops; and
in response to the selection, displaying an existing virtual desktop corresponding to the selected preview.

7. The data processing system of claim 1, wherein determining the state for each of the existing virtual desktops includes:
determining which of the one or more instances was last active on each of the existing virtual desktops;
determining a latest running state for the last active instance; and
providing display data for the latest running state of the last active instance.

8. The data processing system of claim 1, wherein the preview of the first virtual desktop includes a display of a name for the first virtual desktop, and wherein the executable instructions when executed by the processor, further cause the data processing system to perform functions of:
receiving a selection of the displayed name;
in response to receiving selection of the name, presenting an editable input box;
receiving text input in the editable input box; and
renaming the first virtual desktop based on the text input.

9. A method for creating a new virtual desktop in a client device, comprising:
based on a number of open windows on the client device and types of applications with which the open windows are associated, displaying a notification about creating the new virtual desktop;
receiving a user input via the notification, the user input indicating a user's approval of creating the new virtual desktop; and
upon receiving the user input, displaying a user interface (UI) element for creating the new virtual desktop.

10. The method of claim 9, wherein displaying the notification is further based on an output from a machine-learning (ML) model.

11. The method of claim 9, wherein displaying the notification is based on the number of open windows exceeds a predetermined number.

12. The method of claim 9, wherein the notification includes a first UI control for approving creation of the new virtual desktop and a second UI control for disapproving the creation of the new virtual desktop.

13. The method of claim 9, wherein the UI element for creating the new virtual desktop includes a preview of a currently available virtual desktop.

14. A non-transitory computer readable medium on which are stored instructions that, when executed, cause a programmable device to:
receive an input indicating hovering of a pointer over an icon in a toolbar;
identify one or more existing virtual desktops;
determine a state for each of the one or more existing virtual desktops by identifying one or more instances of applications that are currently running in each of the one or more existing virtual desktops and determining a running state for at least one of the one or more instances; and
display a virtual desktop preview of each of the one or more existing virtual desktops in response to the hovering of the pointer over the icon, wherein the virtual desktop preview includes displaying the running state for one of the one or more instances for each of the one or more existing virtual desktops;
receive an input indicating a hovering of the pointer over a virtual desktop preview for one of the existing virtual desktops; and
in response to receiving the input indicating a hovering of the pointer over the virtual desktop preview, display, adjacent to the virtual desktop preview, a window preview of one or more windows that are open on the virtual desktop corresponding to the virtual desktop preview.

15. The non-transitory computer readable medium of claim 14, wherein the icon is a task view icon.

16. The non-transitory computer readable medium of claim 14, wherein the toolbar is a taskbar.

17. The non-transitory computer readable medium of claim 14, wherein the preview is displayed adjacent to the icon.

18. The non-transitory computer readable medium of claim 14, wherein the instructions when executed, further cause the programmable device to:

in response to the hovering of the pointer over the icon, displaying a user interface (UI) element for creating a new virtual desktop.

19. The non-transitory computer readable medium of claim 14, wherein determining the state for each of the one or more existing virtual desktops includes:

determining which of the one or more instances was last active on each of the one or more existing virtual desktops;

determining a latest running state for the last active instance; and providing display data for the latest running state of the last active instance.

20. The non-transitory computer readable medium of claim 14, wherein a name is displayed in the preview for each of the one or more existing virtual desktops.

\* \* \* \* \*